(12) United States Patent
Rinehart

(10) Patent No.: US 6,210,089 B1
(45) Date of Patent: Apr. 3, 2001

(54) FLOOR-MOUNTED PALLET RETAINING LATCH AND METHOD OF OPERATION THEREOF

(75) Inventor: Gregory E. Rinehart, Weatherford, TX (US)

(73) Assignee: SmartFleet, L.P., Dallas, TX (US)

( * ) Notice: Subject to any disclaimer, the term of this patent is extended or adjusted under 35 U.S.C. 154(b) by 0 days.

(21) Appl. No.: 09/152,438

(22) Filed: Sep. 14, 1998

(51) Int. Cl.[7] .............................. B60P 1/64; B63B 25/00; B64C 1/22
(52) U.S. Cl. ................................................. 410/80; 410/77
(58) Field of Search .................................. 410/72, 73, 76, 410/77, 80; 248/500, 506, 680; 292/128, 106, 228, 207

(56) References Cited

U.S. PATENT DOCUMENTS

| | | | |
|---|---|---|---|
| 156,478 | * | 11/1874 | Breidenbach . |
| 794,657 | * | 7/1905 | Boland . |
| 1,360,412 | * | 11/1920 | Kirchner . |
| 1,452,839 | * | 4/1923 | Lotz . |
| 1,649,598 | * | 11/1927 | Kirchner . |
| 3,439,821 | * | 4/1969 | Hand . |
| 6,053,692 | * | 4/2000 | Mason et al. . |

* cited by examiner

Primary Examiner—D. Glenn Dayoan
Assistant Examiner—Scott Carpenter

(57) ABSTRACT

For use in securing a pallet to a supporting floor of a service vehicle, a retaining latch, a method of operating the same to secure the pallet in place and a service vehicle having a latched pallet. In one embodiment, the retaining latch includes: (1) a first member having an aperture therein that allows the first member to be secured to the floor, (2) a second member, coupled to the first member for rotation relative thereto, (3) a spring, coupled to the first and second members, that resiliently urges the second member from an open position toward a closed position with respect to the first member and (4) a pin, extending from the second member toward the first member, adapted to engage and positively secure the pallet against lateral translation when the second member is urged toward the closed position.

5 Claims, 5 Drawing Sheets

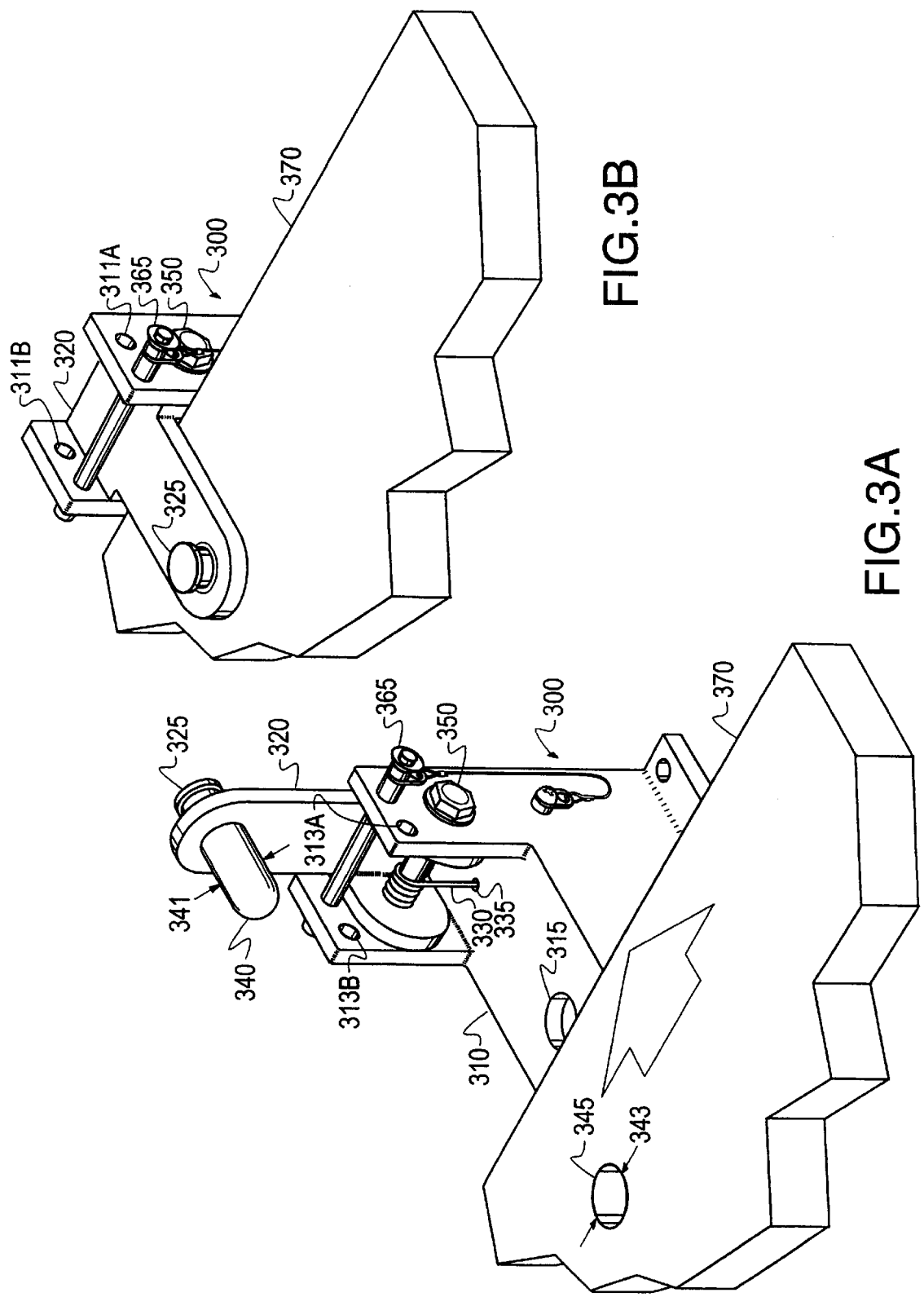

FLOOR-MOUNTED PALLET RETAINING LATCH AND METHOD OF OPERATION THEREOF

TECHNICAL FIELD OF THE INVENTION

The present invention is directed, in general, to load retention systems for vehicles and, more specifically, to a floor-mounted pallet retaining latch and a method of operating the same to retain a pallet in a vehicle.

BACKGROUND OF THE INVENTION

The need to maintain proper engine lubrication in today's automobile has caused the popularity of fast oil change and lubrication shops to grow rapidly. Nevertheless, with their fixed locations, the automobile owner still must take from 15 to 30 minutes from his schedule to have an oil change done while he waits.

While these shops are convenient for a majority of the motoring public, there is one major segment of automobile owners for which this is inconvenient and even costly—rental car agencies. With their large number of vehicles, and the rapid accumulation of mileage on the vehicles, these automobiles are in frequent need of oil change and lubrication. The inconvenience to the rental car agency is in the need to have a driver deliver each automobile to a fast oil change shop, wait on the oil change, and then return the vehicle to the rental car agency lot. With a large rental car agency, this procedure could easily require one person full time simply ferrying vehicles back and forth to the oil change shop. Several factors affect the cost to the rental car agency of having a vehicle's oil changed. In fact, the cost of changing the oil goes far beyond the actual amount paid to the oil change shop. Among the most significant cost factors are: (a) the additional mileage (wear and tear) on the car, (b) the gasoline to drive it to and from the oil change shop, (c) the vehicle's downtime while it is at the oil change shop, (d) the increased accident risk of having the vehicle on the highways while en route, and (e) the nonproductivity of the driver while he or she waits for the oil to be changed. When all of these hidden costs are considered, the total oil change cost could easily double the amount paid to the oil change shop. Alternatively, the rental car agency could invest in its own oil change facility, however that is a capital investment which most agencies are often reluctant to make.

While mobile oil change and lubrication have been done for heavy construction equipment for many years, the essential reasons and approach were different from the invention to be described. The reasons for on-site oil changes of heavy construction equipment are: (1) impracticality of transporting (driving or trailering) the equipment for such minor maintenance, (2) the construction equipment is unavailable for use while being transported and serviced, and (3) few maintenance shops can accommodate the special needs of heavy construction equipment. Because of the size of the equipment being serviced, these heavy equipment service trucks have usually been custom built directly on two ton, or larger, truck frames for the specific needs of the heavy equipment fleet. The large size of the service truck allows sufficient oil and other lubricant volumes to accommodate the large demands of the heavy equipment.

The introduction of mobile oil change operations to service automotive fleets has met with phenomenal acceptance. In particular, some of the largest rental car agencies have embraced the concept of an on-site mobile oil change operation which eliminates their need to constantly shuttle their vehicles back and forth to a fast oil change franchise. An expeditious method of fabricating a mobile lubricant recovery and delivery system was urgently needed. Therefore a stand alone, mobile lubricant recovery and delivery system which could be assembled on a pallet was disclosed in co-pending application Ser No. 09/036,748, filed Mar. 9, 1998, entitled "Integrated Lubricant Delivery and Retrieval Pallet and Method of Manufacture Thereof," commonly assigned with the present application. Not addressed in detail within the application was the method of attaching the pallet to the vehicle's cargo compartment floor. Initially, a conventional bolt and nut approach was used successfully. However, this approach proved both time consuming and somewhat tedious.

Thus, the ability to readily install and extract a lubricant recovery and delivery system pallet from a service vehicle was seriously impacted. Accordingly, a more automated latching system was desired that would expedite the insertion of the pallet into the vehicle by fork lift, and would either self-latch or have minimal human intervention to secure the pallet to the cargo compartment floor. Such a latch would also speed release and removal of the pallet, should it became desirable to move the pallet to another vehicle.

Therefore, what is needed in the art is a more efficient way of outfitting a service vehicle with a comprehensive lubricant changing system and removing such system from the service vehicle as desired.

SUMMARY OF THE INVENTION

To address the above-discussed deficiencies of the prior art, it is a primary object of the present invention to render installation of a pallet in a service vehicle faster and easier.

In the attainment of the above-described primary object, the present invention provides, for use in securing a pallet to a supporting floor of a service vehicle, a retaining latch, a method of operating the same to secure the pallet in place and a service vehicle having a latched pallet. In one embodiment, the retaining latch includes: (1) a first member having an aperture therein that allows the first member to be secured to the floor, (2) a second member, coupled to the first member for rotation relative thereto, (3) a spring, coupled to the first and second members, that resiliently urges the second member from an open position toward a closed position with respect to the first member and (4) a pin, extending from the second member toward the first member, adapted to engage and positively secure the pallet against lateral translation when the second member is urged toward the closed position.

The present invention therefore introduces a novel, pin-based latch that advantageously provides positive engagement with a pallet to resist movement thereof relative to the supporting service vehicle. The spring-action of the latch allows the pallet to be installed in, and removed from, the service vehicle quickly and efficiently, with a minimum of labor.

In one embodiment of the present invention, the first member has a further aperture that receives the pin as the second member is urged toward the closed position. Although not necessary to the present invention, the further aperture provides additional lateral support to the pin as against shear forces developed as the pallet urges against the pin.

In one embodiment of the present invention, the latch further includes a locking member, couplable to the first and second members, that locks the second member in a selectable one of the open and closed positions. The locking member may take the form of a spring-loaded latch or a key.

Therefore, in a related embodiment, at least one of the first and second members has locking ports capable of receiving an elongated locking key therethrough to lock the second member in the closed position.

In one embodiment of the present invention, the pin has a ramp thereon that causes the pin to urge the second member toward the open position as the pallet bears against the ramp. In an embodiment to be illustrated and described, the ramp cooperates with a corresponding ramp on an edge of the pallet. Although not necessary, the ramp preferably does not compromise the security of the pin in holding the pallet in place.

In one embodiment of the present invention, the pin positively secures the pallet against lateral translation in any direction when the second member is urged toward the closed position. Unlike prior art latches, the pin can provide omnidirectional engagement and security for the pallet. This is particularly advantageous given the variety of directions in which forces may be generated in a moving service vehicle.

In one embodiment of the present invention, the spring is a torsional spring located about a hinge coupling the first and second members. Those skilled in the art are familiar with other types of springs and will realize how such springs can be employed in the latch of the present invention.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, and the advantages thereof, reference is now made to the following description taken in conjunction with the accompanying drawings, in which:

FIG. 3A illustrates an isometric view of an alternative embodiment of the latch of FIG. 1 in the open position proximate a portion of a pallet;

FIG. 3B illustrates an isometric view of the latch of FIG. 3A in the closed position engaging a portion of the pallet;

DETAILED DESCRIPTION

Figure 1:
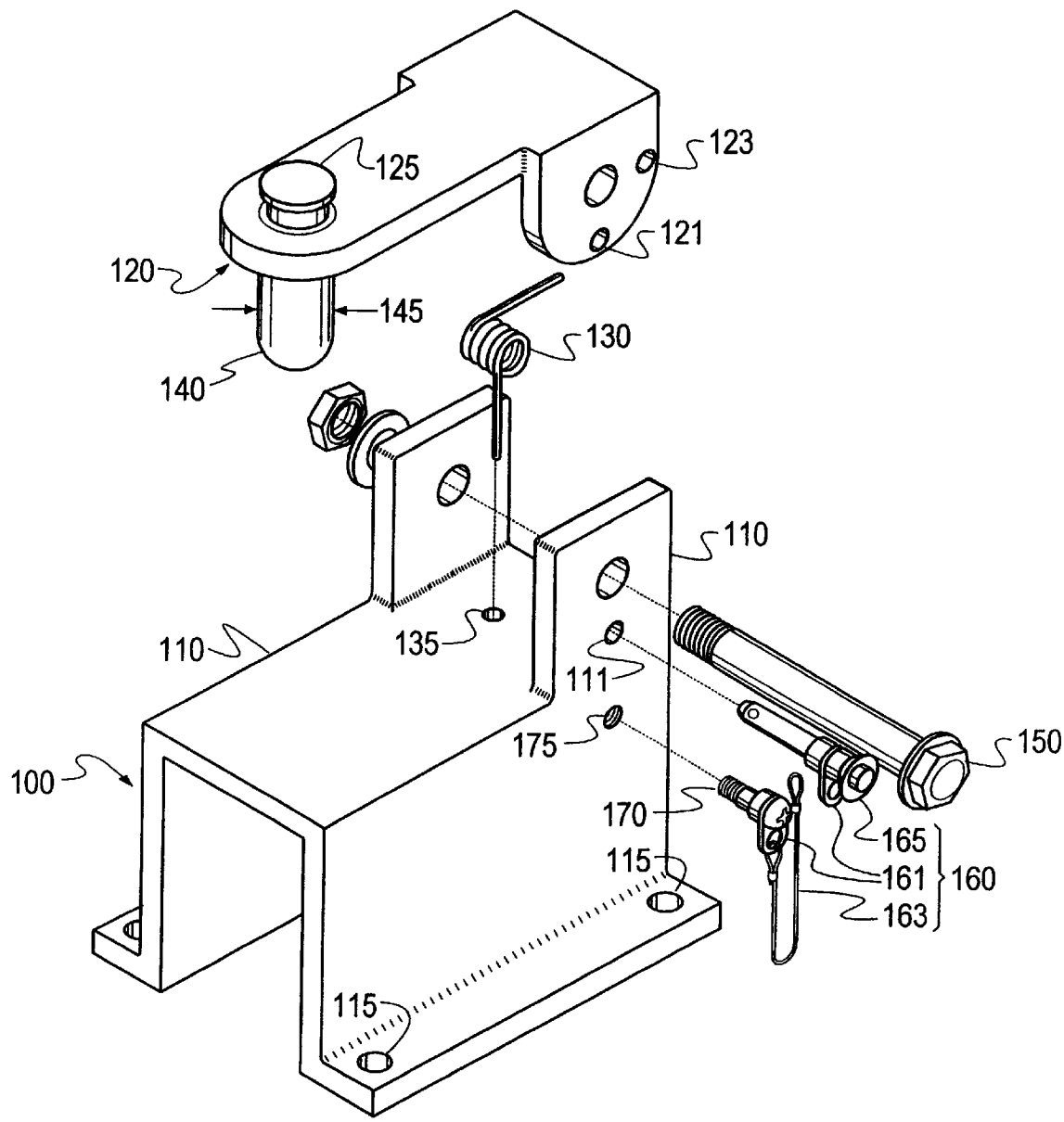
FIG. 1 illustrates an exploded isometric view of one embodiment of a retaining latch constructed according to the principles of the present invention.

Referring initially to FIG. 1, illustrated is an exploded isometric view of one embodiment of a retaining latch constructed according to the principles of the present invention. The retaining latch, generally designated 100, comprises a first member 110, a second member 120, a spring 130, and a securing pin 140. The first member 110 acts, and may be referred to, as the base of the latch 100. In a preferred embodiment, the first member 110 comprises a mounting aperture 115 through which a mounting bolt (not shown) is inserted to secure the latch 100 to the vehicle cargo floor. In the illustrated embodiment, a plurality of mounting apertures 115 are shown; however, one who is skilled in the art will recognize that alternative embodiments may readily be designed with either a greater or lesser number of mounting apertures. The second member 120 is rotatably attached to the first member 110 through a hinge pin 150. The second member 120 further comprises a knob 125 for manually opening the latch 100. In the illustrated embodiment, the spring 130 is a torsion spring mounted about the hinge pin 150, and between the first member 110 and the second member 120, such that the spring 130 resiliently urges the second member 120 positively toward the first member 110. One skilled in the art will recognize that other types of springs, e.g., flat, compression, etc., may likewise be satisfactorily employed for the intended function. The spring 130 is tensioned in a restraining hole 135 extending through the first member 110. Those who are skilled in the art will readily conceive other methods of properly tensioning the spring 130. The securing pin 140 extends from the second member 120 so that the securing pin 140 may contact the first member 110 at the urging of the spring 130. In the illustrated embodiment, the securing pin 140 is circular in cross section and has an outside diameter 145. In an alternative embodiment, the pin 140 may be rectangular, or of approximately square cross section. One who is skilled in the art will recognize that other cross sections of the pin 140 may be readily employed for specific reasons while remaining within the scope and intent of the present invention. In yet another embodiment, the second member 120 and the securing pin 140 may be integrally formed. In a preferred embodiment, the latch 100 further comprises a locking member assembly 160, and a screw 170.

In the illustrated embodiment, the locking member assembly 160 comprises a plurality of eyelets 161, a lanyard 163, and a locking member 165. In a preferred embodiment, the locking member 165 is a ball lock pin and is secured to the latch base 110 with the screw 170 that mates with a threaded hole 175. Attachment of the locking member assembly 160 to the latch base 110 assures that the locking member 165 is always available for use. Those who are skilled in the art will readily conceive other embodiments of the locking member 165, e.g., detent pin, straight cotter pin, hairpin cotter pin, alien screw, etc.

The first member 110 further comprises a first member locking aperture 111. Similarly, the second member 120 further comprises first and second locking apertures 121, 123, respectively. The first and second locking apertures 121, 123 and first member locking aperture 111 are designed to accept the locking member 165 of the locking member assembly 160. When the latch 100 is open, the second locking aperture 123 of the second member 120 aligns with the first member locking aperture 111. With the first and second members 110, 120 in this relative position, the locking member 165 may be inserted through both the first member locking aperture 111 and the second locking aperture 123. Likewise, when the latch 100 is closed, the first member locking aperture 111 aligns with the first locking aperture 121. With the first and second members 110, 120 in this relative position, the locking member 165 may be inserted through both the first member locking aperture 111 and the first locking aperture 121. Thus the locking member 165 secures the latch 100 selectively in either an open or a closed position.

Figure 2:
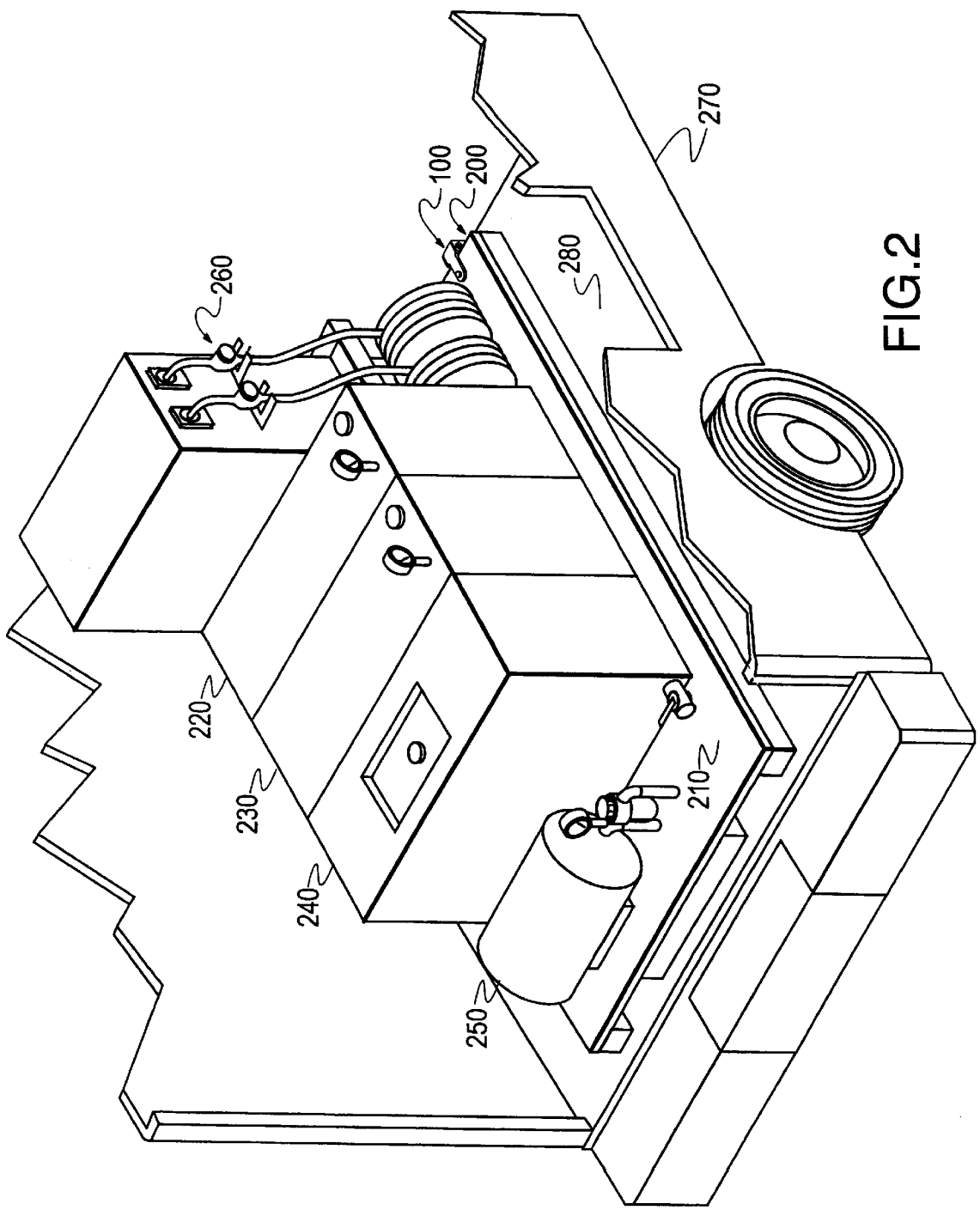
FIG. 2 illustrates an isometric view of a service vehicle and a palletized lubricant delivery and retrieval system.

Referring now to FIG. 2, illustrated is an isometric view of a service vehicle and a palletized lubricant delivery and retrieval system. A lubricant delivery and retrieval system, generally designated 200, comprises a pallet 210, first and second lubricant source tanks 220, 230, a used lubricant collection tank 240, a pressure source 250, and a lubricant delivery system 260. The employment and operation of the lubricant delivery and retrieval system is explained in detail in co-pending application Ser. No. 09/036,748, filed Mar. 9, 1998, entitled "Integrated Lubricant Delivery and Retrieval Pallet and Method of Manufacture Thereof," commonly assigned with the present application. The pallet 210 further comprises an attachment aperture (to be described in FIG. 3) therethrough designed to engage the pin 140 of the latch 100.

In a preferred embodiment, a service vehicle, generally designated 270, may be a commercially available van with a cargo floor 280. Attached to the cargo floor 280 may be a plurality of retaining latches 100 (one shown). In a preferred embodiment, the retaining latch 100 is securely fastened to the cargo floor 280 of the service vehicle 270 with a bolt and nut (not shown). However, one who is skilled in the art will recognize that other methods of mechanical attachment of the latch 100 to the cargo floor 280 may be used while remaining within the scope of the present invention.

Referring now to FIGS. 3A and 3B, illustrated are isometric views of an alternative embodiment of the retaining latch of FIG. 1. FIG. 3A illustrates an isometric view of an alternative embodiment of the latch of FIG. 1 in the open position proximate a portion of a pallet 370. FIG. 3B illustrates an isometric view of the latch of FIG. 3A in the closed position engaging a portion of the pallet 370. In this embodiment, a latch 300 comprises a first member 310 with a second aperture 315 located so as to receive at least a portion of the pin 340 when the latch 300 is in the closed position. The second aperture 315 may be completely through or only partly through the first member 310. In this embodiment, the first member 310 further comprises paired first and second locking apertures, collectively designated 311 and 313, respectively. Thus, the first locking aperture 311 comprises the pair of apertures 311a and 311b, and the second locking aperture 313 comprises the pair of apertures 313a and 313b. The latch 300 comprises a locking member 365 that engages a surface of the second member 320 through the locking apertures 311, 313 in either of two fixed relationships, latch open (FIG. 3A) or latch closed (FIG. 3B), with respect to the first member 310. In this embodiment, the locking member 365 is of sufficient length to pass completely across the first member 310 with the second member 320 interposed. As shown in FIG. 3A, with locking member 365 in the paired apertures 311a and 311b, spring 330 urges the second member 320 against the locking member 365, which holds the latch 300 open. Likewise, as shown in FIG. 3B, positioning locking member 365 in the paired apertures 313a and 313b, spring 330 urges the second member 320 against the first member 310. The position of locking member 365 in the locking apertures 313a, 313b prevents the second member 320 from moving toward the open position.

Focusing now on the pallet 370, provision is made for an attachment aperture 345 through the pallet 370. The attachment aperture 345 is of a diameter 343 only slightly greater than the outside diameter 341 of the pin 340. Thus, the pin 340 may locate in the attachment aperture 345.

Figure 4A:
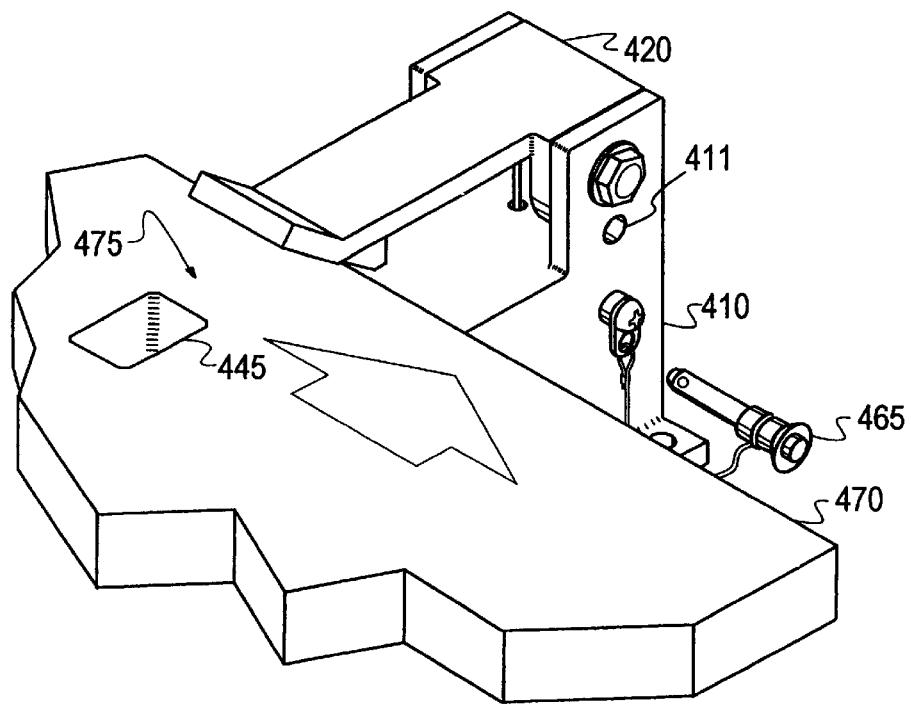
FIG. 4A illustrates an isometric view of another alternative embodiment of the latch of FIG. 1 in the closed position proximate a portion of the pallet.
Figure 4B:
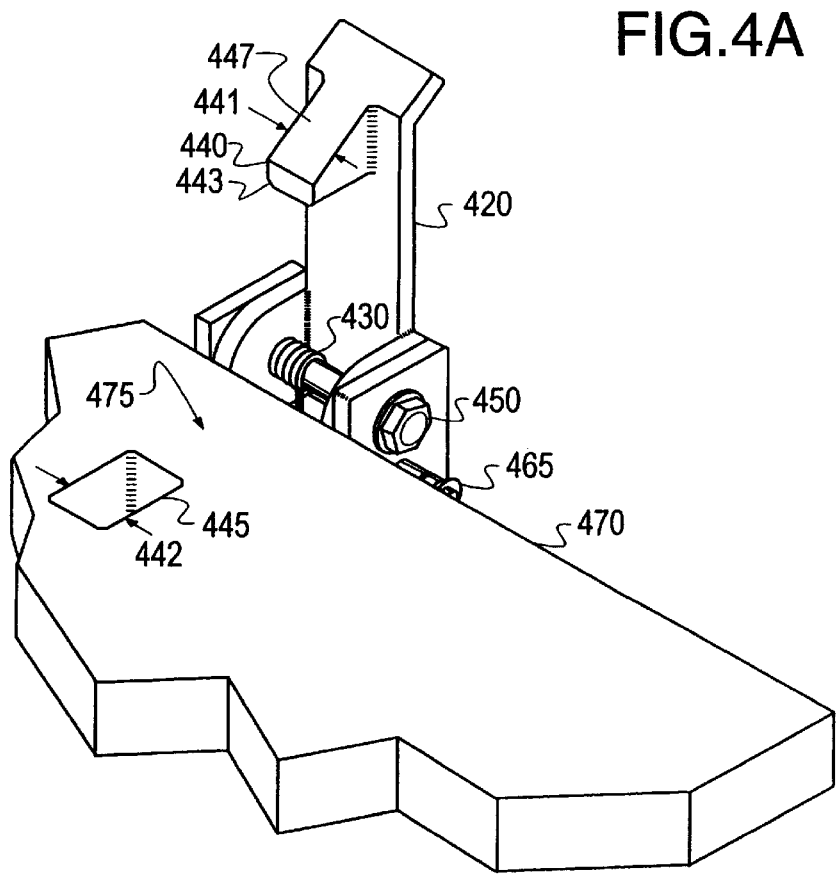
FIG. 4B illustrates an isometric view of the latch of FIG. 4A in the open position.
Figure 4C:
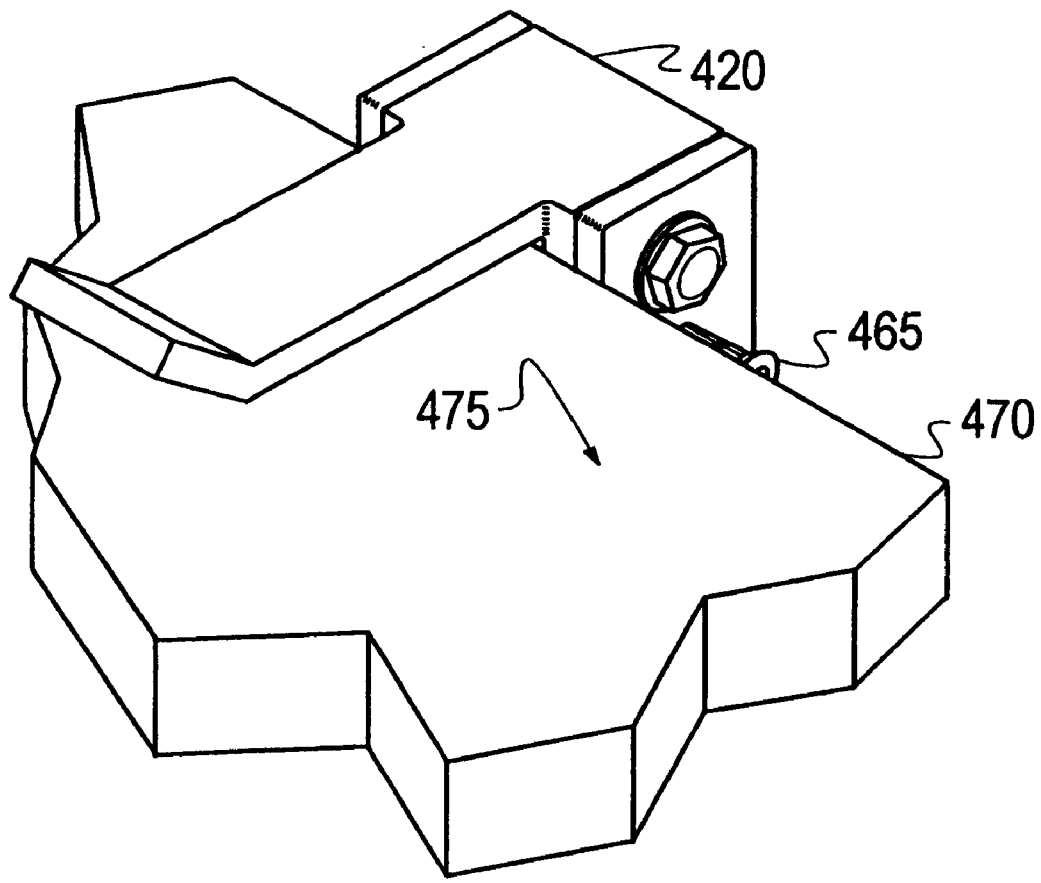
FIG. 4C illustrates an isometric view of the latch of FIG. 4A in the closed position engaged to a portion of the pallet.

Referring now to FIGS. 4A, 4B and 4C, illustrated are isometric views of another alternative embodiment of the latch of FIG. 1. FIG. 4A illustrates a latch 400 in the closed position proximate a portion of the pallet 470 as the pallet is being installed. FIG. 4B illustrates the latch 400 in the open position as would be necessary to remove the pallet. FIG. 4B is also presented to assure an understanding of the assembled parts and features. FIG. 4C illustrates the latch 400 in the closed position engaged to a portion of the pallet 470. Refer now to FIG. 4B. In the illustrated embodiment, a securing pin 440 is of approximately rectangular cross section. In this embodiment, an attachment aperture 445 in a pallet 470 is of a width 442 slightly larger than a thickness 441 of the pin 440. In another aspect of the illustrated embodiment, the edges of the pin 440 may be rounded or chamfered 443. The pin 440 further comprises a ramp 447 designed to engage an edge of the pallet 470. Refer now to FIG. 4A with continuing reference to FIG. 4B. In the illustrated embodiment, the first member 410 comprises a locking port 411 and the second member 420 comprises locking ports (not shown) analogous to locking ports 121 and 123 of FIG. 1. The locking port 411 may receive a single locking member 465 when the latch 400 is in either the open or closed position. With locking member 465 removed from the locking port 411, horizontal motion of the pallet 470 in contact with the ramp 447 causes the pin 440 and the second member 420 to ride up and over a portion of the pallet surface 475. Thus as the pallet 470 is inserted into the vehicle (see FIG. 2), the pallet 470 urges the latch 400 toward a partially open position. When the pin 440 aligns with the attachment aperture 445, the spring 430 urges the pin 440, by way of the second member 420, into the attachment aperture 445 as shown in FIG. 4C. Thus, the engagement of the pin 440 in the attachment aperture 445 secures the pallet 470 against lateral translation in any direction. Thus, with the latch 400 in the closed position (FIG. 4C), the locking key 465 inserted into the locking port 411 assures that the latch 400 does not open inadvertently. One who is skilled in the art will readily envision an alternative embodiment of a single locking port in the second member that cooperates with dual locking ports in the first member to accomplish the same objectives as described above.

From the above, it is apparent that the present invention provides, for use in securing a pallet to a supporting floor of a service vehicle, a retaining latch, a method of operating the same to secure the pallet in place and a service vehicle having a latched pallet. In one embodiment, the retaining latch includes: (1) a first member having an aperture therein that allows the first member to be secured to the floor, (2) a second member, coupled to the first member for rotation relative thereto, (3) a spring, coupled to the first and second members, that resiliently urges the second member from an open position toward a closed position with respect to the first member and (4) a pin, extending from the second member toward the first member, adapted to engage and positively secure the pallet against lateral translation when the second member is urged toward the closed position.

Although the present invention and its advantages have been described in detail, those skilled in the art should understand that they can make various changes, substitutions and alterations herein without departing from the spirit and scope of the invention in its broadest form.

What is claimed is:

1. For use in securing a pallet to a supporting floor of a service vehicle, a retaining latch, comprising:

a first member having an aperture therein that allows said first member to be secured to said floor;

a second member, coupled to said first member for rotation relative thereto;

a spring, coupled to said first and second members, that resiliently urges said second member from an open position toward a closed position with respect to said first member;

a pin, extending from said second member toward said first member, adapted to engage and positively secure said pallet against lateral translation when said second member is urged toward said closed position; and a locking member, couplable to said first and second members, that locks said second member in a selectable one of said open and closed positions.

2. The latch as recited in claim 1 wherein said first member has a further aperture that receives said pin as said second member is urged toward said closed position.

3. The latch as recited in claim 1 wherein said pin positively secures said pallet against lateral translation in any direction when said second member is urged toward said closed position.

4. The latch as recited in claim 1 wherein said spring is a torsional spring located about a hinge coupling said first and second members.

5. The latch as recited in claim 1 wherein at least one of said first and second members has locking ports capable of receiving an elongated locking key therethrough to lock said second member in said closed position.

* * * * *